United States Patent
Levit et al.

(10) Patent No.: US 9,542,931 B2
(45) Date of Patent: Jan. 10, 2017

(54) LEVERAGING INTERACTION CONTEXT TO IMPROVE RECOGNITION CONFIDENCE SCORES

(71) Applicant: Microsoft Technology Licensing, LLC, Redmond, WA (US)

(72) Inventors: Michael Levit, San Jose, CA (US); Bruce Melvin Buntschuh, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/521,990

(22) Filed: Oct. 23, 2014

(65) Prior Publication Data
US 2015/0046163 A1 Feb. 12, 2015

Related U.S. Application Data

(62) Division of application No. 12/912,938, filed on Oct. 27, 2010, now Pat. No. 8,886,532.

(51) Int. Cl.
| | |
|---|---|
| G10L 15/00 | (2013.01) |
| G10L 15/01 | (2013.01) |
| G10L 15/08 | (2006.01) |
| G10L 15/22 | (2006.01) |

(52) U.S. Cl.
CPC ............... G10L 15/01 (2013.01); G10L 15/08 (2013.01); G10L 15/22 (2013.01)

(58) Field of Classification Search
USPC .................. 704/231–257, 270–275
See application file for complete search history.

(56) References Cited

U.S. PATENT DOCUMENTS

| | | | | |
|---|---|---|---|---|
| 4,839,831 A * | 6/1989 | Imajo | ..................... | F01M 11/10 |
| | | | | 123/196 S |
| 5,835,893 A * | 11/1998 | Ushioda | ................. | G10L 15/18 |
| | | | | 704/10 |
| 6,442,519 B1 * | 8/2002 | Kanevsky | ............... | G10L 15/07 |
| | | | | 704/243 |
| 6,574,597 B1 * | 6/2003 | Mohri | ................... | G10L 15/183 |
| | | | | 704/251 |

(Continued)

OTHER PUBLICATIONS

U.S. Appl. No. 12/912,938, Office Action mailed Feb. 28, 2013, 12 pages.
U.S. Appl. No. 12/912,938, Amendment and Response filed Jul. 29, 2013, 12 pages.
U.S. Appl. No. 12/912,938, Office Action mailed Sep. 19, 2013, 13 pages.

(Continued)

Primary Examiner — Jesse Pullias
(74) Attorney, Agent, or Firm — Steven J. Spellman; Sandy Swain; Danielle Johnson Holmes

(57) ABSTRACT

On a computing device a speech utterance is received from a user. The speech utterance is a section of a speech dialog that includes a plurality of speech utterances. One or more features from the speech utterance are identified. Each identified feature from the speech utterance is a specific characteristic of the speech utterance. One or more features from the speech dialog are identified. Each identified feature from the speech dialog is associated with one or more events in the speech dialog. The one or more events occur prior to the speech utterance. One or more identified features from the speech utterance and one or more identified features from the speech dialog are used to calculate a confidence score for the speech utterance.

20 Claims, 10 Drawing Sheets

(56) References Cited

U.S. PATENT DOCUMENTS

| | | | |
|---|---|---|---|
| 7,031,917 B2* | 4/2006 | Asano | G10L 15/20 704/231 |
| 7,302,392 B1 | 11/2007 | Thenthiruperai et al. | |
| 8,515,736 B1* | 8/2013 | Duta | G10L 15/1822 704/9 |
| 8,886,532 B2 | 11/2014 | Levit et al. | |
| 2002/0133341 A1 | 9/2002 | Gillick et al. | |
| 2002/0193997 A1* | 12/2002 | Fitzpatrick | G10L 15/26 704/270 |
| 2005/0080628 A1* | 4/2005 | Kuperstein | H04M 3/4938 704/270.1 |
| 2005/0183032 A1* | 8/2005 | Bushey | G10L 15/22 715/809 |
| 2006/0149544 A1 | 7/2006 | Hakkani-Tur | |
| 2006/0168335 A1 | 7/2006 | Hodjat et al. | |
| 2006/0200350 A1 | 9/2006 | Attwater et al. | |
| 2006/0271364 A1 | 11/2006 | Mirkovic et al. | |
| 2009/0018829 A1 | 1/2009 | Kuperstein | |
| 2009/0018833 A1 | 1/2009 | Kozat et al. | |
| 2009/0037175 A1 | 2/2009 | Wang | |
| 2010/0198598 A1 | 8/2010 | Herbig | |

OTHER PUBLICATIONS

U.S. Appl. No. 12/912,938, Amendment and Response filed Feb. 19, 2014, 12 pages.
U.S. Appl. No. 12/912,938, Office Action mailed Mar. 20, 2014, 15 pages.
U.S. Appl. No. 12/912,938, Amendment and Response filed Jun. 20, 2014, 11 pages.
U.S. Appl. No. 12/912,938, Notice of Allowance mailed Jul. 15, 2014, 12 pages.
Bohus et al., "Integrating Multiple Knowledge Sources for Utterance-level Confidence Annotation", Nov. 2002, 29 pages.
Carpenter et al., Is This Conversation on Track? accessed at: http://citeseerx.ist.psu.edu/viewdoc/download?doi=I O. I. I. I 35.3 I 30&rep=repl &type=pdf; accessed on Aug. 10, 2010, 4 pages.
Hazen et al., Recognition Confidence Scoring for Use in Speech Understanding Systems, accessed at: http://grou12s.csail.mit.edu/sls//publications/2000/asr2000.Qdf; accessed on Aug. 10, 2010, 8 pages.
Litman et al., Automatic Detection of Poor Speech Recognition at the Dialogue Level, accessed at: http://acl.ldc.upenn.edu/P/P99/P99-1040.pdf; accessed on Aug. 10, 2010, 8 pages.
Sudoh et al., Post-dialogue Recognition Confidence Scoring for Improving, Copyright 2003, 6 pages.

* cited by examiner

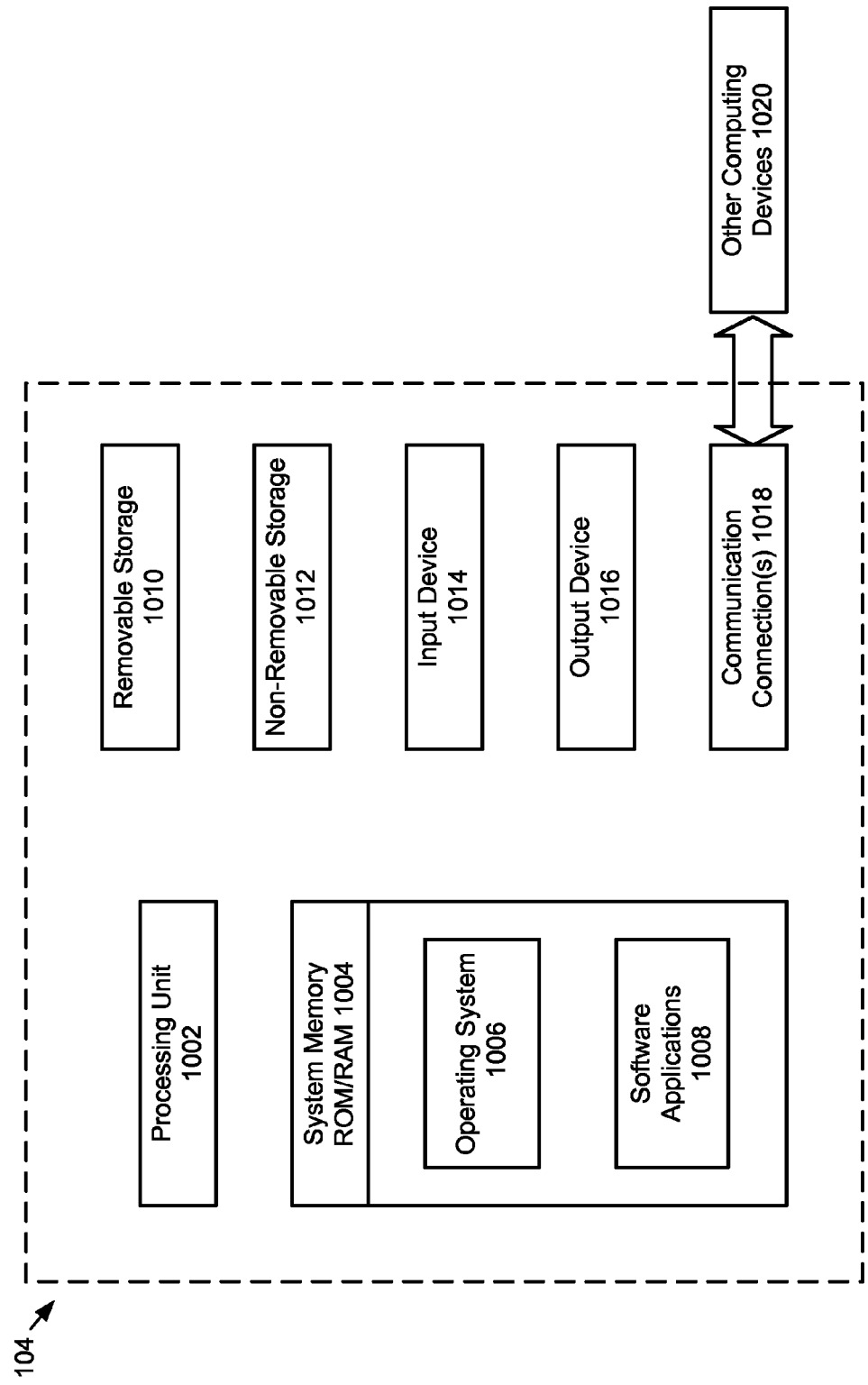

LEVERAGING INTERACTION CONTEXT TO IMPROVE RECOGNITION CONFIDENCE SCORES

CROSS-REFERENCE TO RELATED APPLICATIONS

This application is a Divisional of U.S. patent application Ser. No. 12/912,938, filed Oct. 27, 2010, entitled "LEVERAGING INTERACTION CONTEXT TO IMPROVE RECOGNITION CONFIDENCE SCORES," now issued U.S. Pat. No. 8,886,532, which application is incorporated herein by reference in its entirety.

BACKGROUND

Speech recognition systems provide an automated means for receiving and responding to human speech. The speech recognition systems are typically trained to recognize speech patterns and to provide a best guess for the interpretation of speech utterances. However, because of the wide variety of dialects used, the degrees of speech clarity and other factors, confidence in recognition results can vary.

The determination of recognition confidence for a speech utterance typically involves the evaluation of one or more features of the speech utterance. However, events associated with the overall speech dialog are typically not taken into account when determining recognition confidence.

SUMMARY

Embodiments of the disclosure are directed to a method for improving speech recognition on a computing device. On the computing device a speech utterance is received from a user. The speech utterance is a section of a speech dialog. The speech dialog includes a plurality of speech utterances. On the computing device, one or more features from the speech utterance are identified. Each identified feature from the speech utterance is a specific characteristic of the speech utterance. On the computing device, one or more features from the speech dialog are identified. Each identified feature from the speech dialog is associated with one or more events in the speech dialog. The one or more events occur prior to the speech utterance. On the computing device, one or more identified features from the speech utterance and one or more identified features from the speech dialog are used to calculate a confidence score for the speech utterance.

The details of one or more techniques are set forth in the accompanying drawings and the description below. Other features, objects, and advantages of these techniques will be apparent from the description, drawings, and claims.

DESCRIPTION OF THE DRAWINGS

FIG. 10 shows example components of the speech recognition system of FIG. 1.

DETAILED DESCRIPTION

The present application is directed to systems and methods for improving recognition confidence of speech utterances in a speech recognition system. In a typical speech recognition system, speech utterances from a caller are automatically transcribed and processed. The speech recognition system is trained to recognize speech utterances based on speech models included within the speech recognition system. However, because the models are not perfect and because speech utterances do not always conform to the models, mistakes are sometimes made. In order to make a determination as to whether the recognition of a speech utterance is correct, the speech recognition system typically calculates a recognition confidence score for each speech utterance.

The systems and methods in the present disclosure leverage the context of speech utterances within an overall speech dialog to improve recognition confidence scores for each speech utterance. In a one scenario, the context of previous speech utterances in the speech dialog aids in improving recognition confidence for a current speech utterance. In an alternate scenario, the context of both previous speech utterances and future speech utterances, as derived from a log file, are used to improve a speech recognition model.

In this disclosure, a speech utterance is defined as a section of a speech dialog comprising the time from when one party starts to speak to the time up when the first party finishes speaking and a second party starts to speak. Thus, a speech utterance may be thought of as a turn or interaction in the speech dialog. A speech utterance may comprise a word, a sentence or several sentences. For example, if in response to a prompt for a city name, a caller says "Mountain View", "Mountain View" is considered a speech utterance. If in response to a prompt to place an order, the caller says "one large pizza", "one large pizza is another speech utterance. A speech dialog includes a plurality of speech utterances.

Recognition confidence is typically provided as a score representing a confidence level. For example, if a speech recognition system has 100% confidence that a speech utterance is correctly understood, the confidence level for the speech utterance may be given a score with a value of one. If the speech recognition system has zero confidence that the speech utterance is correctly understood, the confidence level for the speech utterance may be given a score with a value of zero. Similarly, if the speech recognition system has a medium level of confidence that the speech utterance is correctly understood, the confidence level for the speech utterance may be given a score of 0.5. Other example scoring scales are possible.

Figure 1:
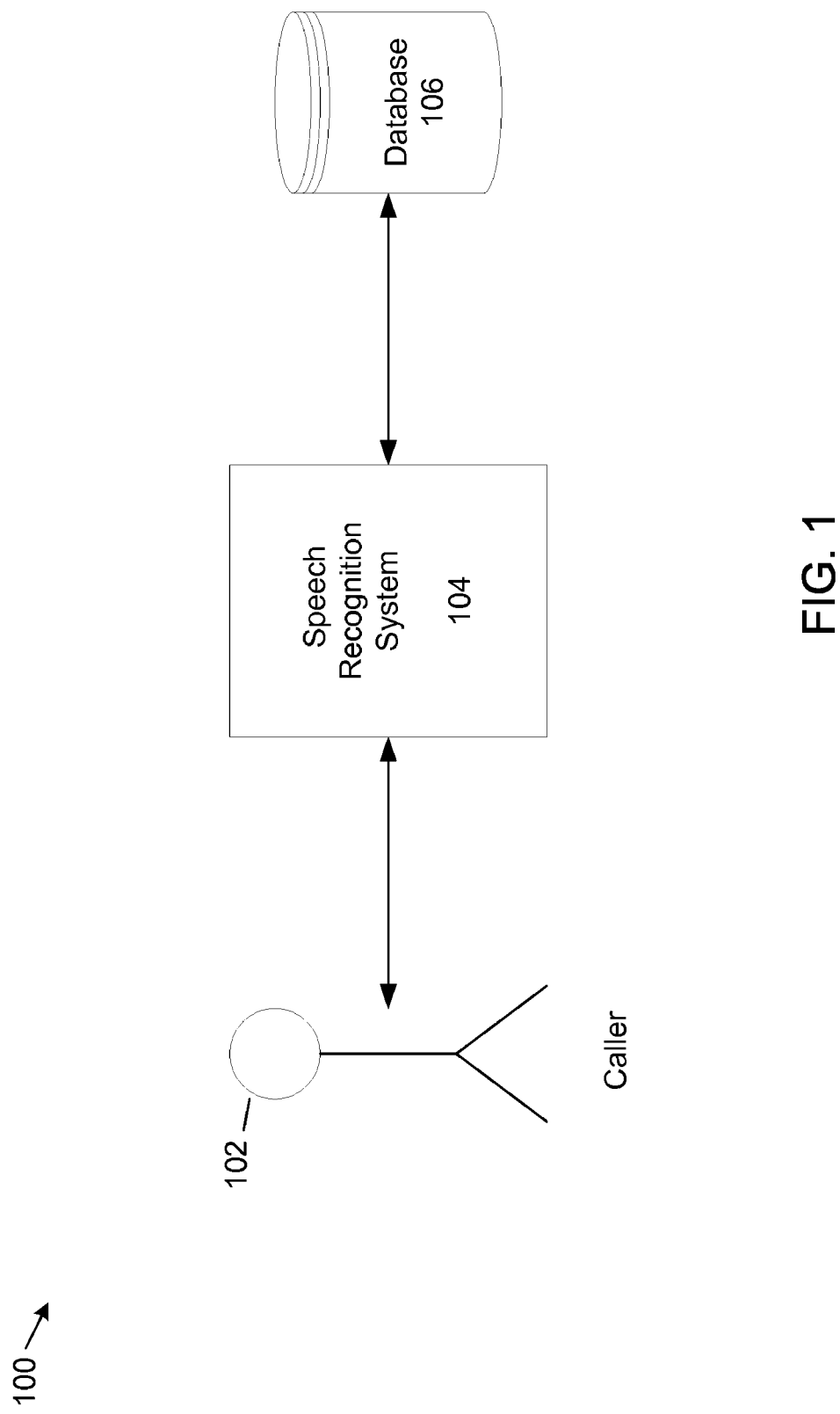
FIG. 1 shows an example system that supports automated speech recognition.

FIG. 1 shows an example system 100 used in speech recognition. The example system 100 includes a caller 102, a speech recognition system 104 and a database 106. In other examples the database 106 may be included as part of the speech recognition system 104. In the example system 100, the database 106 stores log records of speech dialogs, as discussed in more detail herein.

The speech recognition system 104 is typically a system that interprets the utterances of caller 102 and responds in kind, sometimes by prompting the user for additional information. For example, the speech recognition system 104 may be used to screen telephone calls and route the calls to the appropriate person or area in a company. Some example applications may be routing calls in a medical center or at a health care provider or at a government office. When a call is received, the example speech recognition system 104 may first prompt the caller 102 for the caller's name or for an ID number for the caller. The caller may say the name or the ID number. When the speech recognition system 104 can distinguish and recognize the name and the ID number, the speech recognition system 104 may prompt the user for additional information. For example, the speech recognition system 104 may prompt the user with a menu of choices, such as selecting where to further direct the call.

Each call to the example speech recognition system 104 comprises a plurality of speech utterances, each speech utterance corresponding to an interaction in the overall speech dialog of the call. For example, responding to a request for a name or an ID comprises one speech utterance. Making a selection from a menu of choices by saying a name of a particular menu item comprises a second speech utterance. Each call to the speech recognition system 104 is typically recorded and saved in a database, for example database 106. In addition to maintaining a historical record of speech dialogs, the record of speech dialogs comprises a log file that can be used to improve the recognition capability of the speech recognition system 104. The use of a log file to improve the recognition capability of the speech recognition system 104 is explained later in this disclosure.

Figure 2:
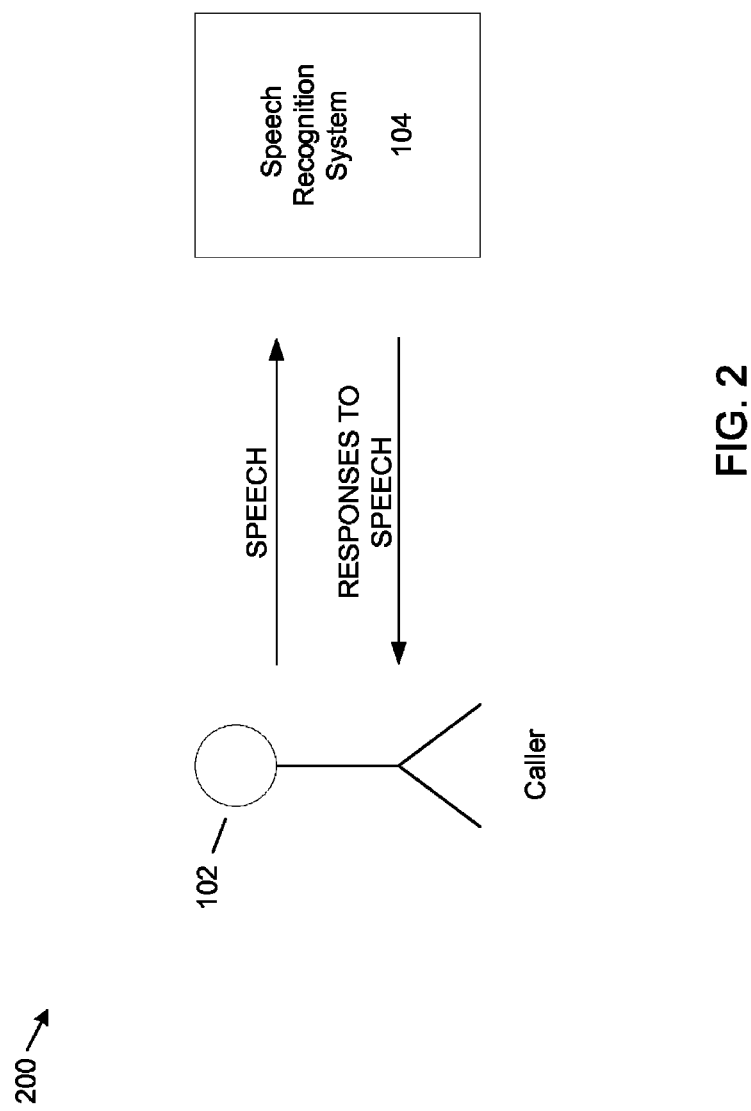
FIG. 2 shows a simplified illustration of an interaction between the example caller and the example speech recognition system of FIG. 1.

FIG. 2 shows a simplified illustration of an interaction between the example caller 102 and the example speech recognition system 104. In an interaction, the caller 102 speaks and the speech recognition system 104 responds to the speech utterances of the caller. Typically, the speech recognition system 104 prompts the user for some information, for example, the name of the caller 102. When the caller 102 responds, the speech utterance comprising the response is automatically transcribed and a recognition confidence score is generated for the speech utterance. Depending on the recognition confidence score of the speech utterance, the speech recognition system 104 may or may not prompt the user to repeat the speech utterance.

For example, when the recognition confidence score for the speech utterance is low, indicating a low level of confidence in the speech utterance recognition, the speech recognition system 104 reprompts the caller 102 for the same information, in this case asking the caller 102 to repeat his or her name. Similarly, when the recognition confidence score is high, indicating that the speech recognition system is completely confident with the speech utterance recognition, the speech recognition system 104 does not reprompt the user. When the recognition confidence score is neither high nor low, the speech recognition system 104 asks for confirmation that the recognition of the speech utterance is correct. For example, the speech recognition system 104 may ask the caller 104 to confirm that his or her name is correct. In this example, the speech recognition system has three levels of confidence—low, medium and high, corresponding to full re-prompt, confirmation prompt only (repeating information such as name, city, etc.) or no re-prompt, respectively.

Figure 3:
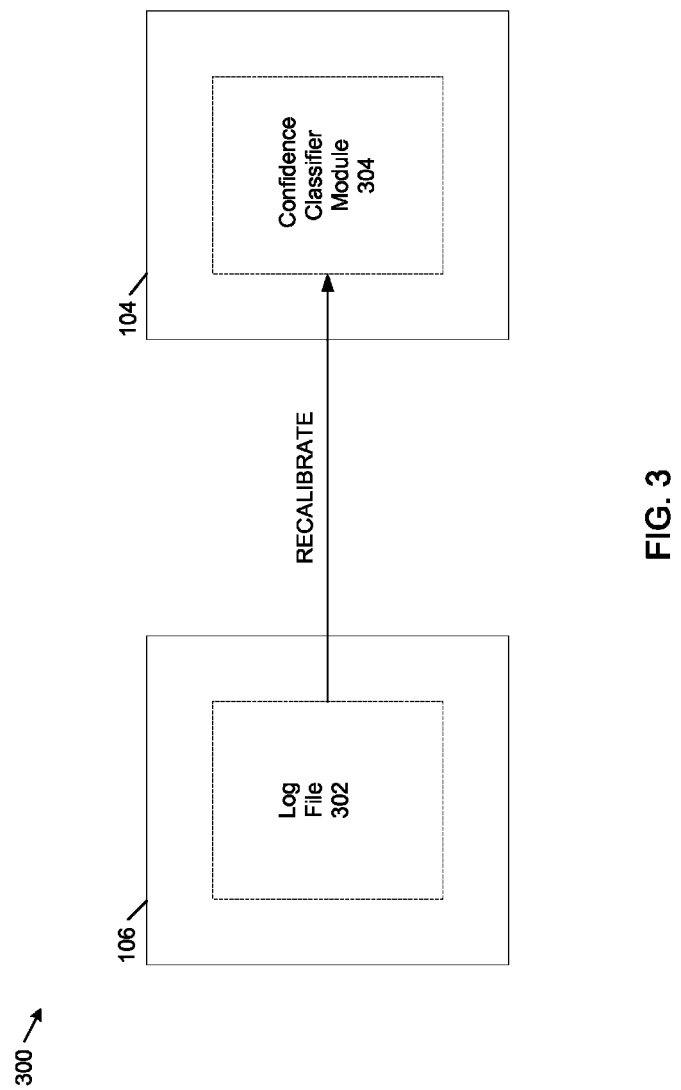
FIG. 3 shows a system in which an example log file is used to retrain speech models for the example speech recognition system of FIG. 1.

FIG. 3 shows a system 300 in which an example log file 302 is used to retrain the speech models in the example speech recognition system 104. Some of the speech models are contained in an example confidence classifier module 304 that is part of the speech recognition system 104. The example log file 302, stored on the example database 106, stores one or more speech dialogs, each comprising one or more speech utterances. The log file 302 also stores the calculated recognition confidence score of each speech utterance. By analyzing dialog-level features such as the position of each speech utterance within the context of a complete speech dialog in conjunction with local features from each speech utterance, the speech recognition system can improve the determination of the correctness of the recognition for each speech utterance. As a result of analyzing the log file 302, the speech models can be retrained so that future speech recognition can be improved.

Figure 4:
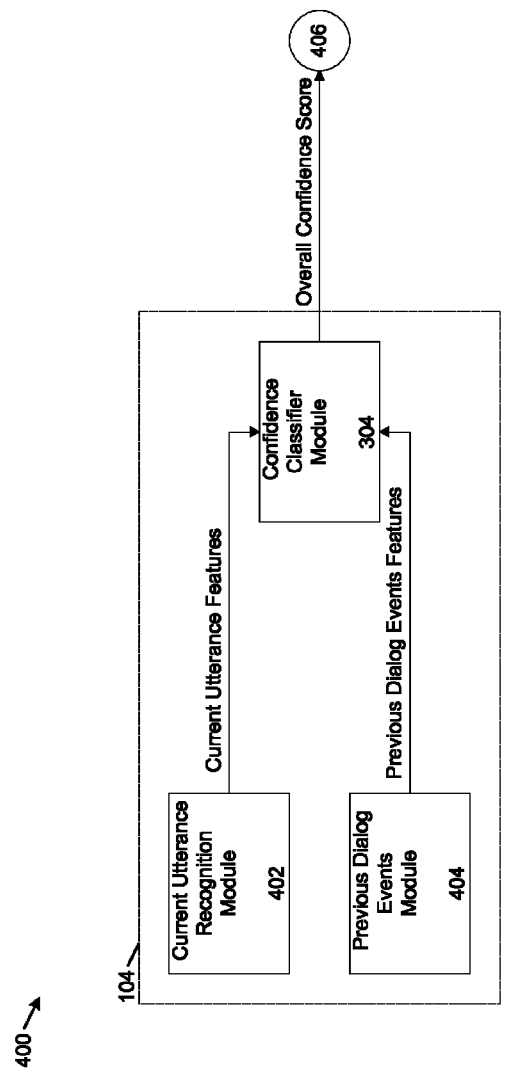
FIG. 4 shows an example speech recognition system in which the recognition confidence score of a current utterance is adjusted by previous dialog events.

FIG. 4 shows an example system 400 in which the recognition confidence score of a current speech utterance is adjusted by previous dialog events. The example system 400 includes a current utterance recognition module 402, previous dialog events module 404, a confidence classifier module 304 and an overall confidence score 406. The current utterance recognition module 402 processes the acoustic signal corresponding to the speech utterance, evaluates local features from the speech utterance and calculates a preliminary confidence score for the current speech utterance. A feature is a defined in this disclosure as a specific characteristic of a speech utterance or of an overall speech dialog that can be evaluated as a numerical value.

One example feature for a speech utterance is the value of an acoustic match for the speech utterance. The determination of an acoustic match for the speech utterance involves matching recognized words in the speech utterance with candidate words obtained from one or more speech models. For this example feature, a value is generated that represents the degree of confidence to which the speech utterance is recognized.

In the determination of an acoustic level match, several candidates for a model match may be generated and these match candidates may be ranked. The determination of how close the highest candidate path is to the second highest candidate path constitutes another example feature. Other features may include the length of the utterance, the noise level of the utterance, etc. Additional features are possible. Each feature is assigned a value, for example a value, between zero and one. For example, a high value may indicate a high degree of confidence that the highest candidate path is similar to the second highest confidence path or that the utterance contains a high level of noise. The combination of features from a speech utterance is known as a feature vector. The feature vector represents local features associated with a speech utterance.

The previous dialog events module 404 derives information from previous speech utterances in the dialog that can be used to improve the confidence level of the current speech utterance. The derived information comprises an additional set of features, characterized as global features of the overall speech dialog.

The global features are typically associated with events in the overall speech dialog. For example, the position of each previous utterance in the current dialog is an example of a global feature. The position of each previous utterance in the dialog provides context for each speech utterance and helps improve the recognition of each speech utterance. Another example of a global feature is the number of times a caller is re-prompted for a previous utterance.

The degree of re-prompting for one speech utterance can alter the confidence level of a succeeding speech utterance. For example, if a previous speech utterance had a low confidence level, because a full re-prompt was performed, there will be less confidence that the succeeding speech utterance was recognized correctly. Thus, a global feature representing a high degree of re-prompting can be used to adjust the overall confidence score for the current speech utterance.

The example confidence classifier module 304 receives a local feature vector and also receives a global feature vector representing features from previous dialog events. The confidence classifier module 304 processes the local feature vector from the current utterance recognition module 402 and the global features from the previous dialog events module 404 to determine an overall confidence score 406 for the current speech utterance.

In a simple scenario, the confidence classifier module 304 multiplies the individual values from the local feature vector to determine local confidence score for the current speech utterance. For example, if a value representing an acoustic match is 0.8, meaning 0.8 probability that the acoustic match is correct, and if a value representing noise in the acoustic signal is 0.7, then a partial confidence score for the current speech utterance is 0.56, calculated as 0.8 multiplied by 0.7. In a similar manner for this example, the values for all other features in the local feature vector are multiplied together to produce a confidence score for the current speech utterance. In other examples, the confidence classifier module 304 and other classifier modules may use different mathematical modules to determine a confidence score from the local feature vector.

The confidence classifier module 304 also receives a global feature vector that includes features from previous dialog events. For example, a numerical value is typically assigned to the level of re-prompting that was done the previous utterances in the dialog. In some examples, a high value indicates that very little re-prompting occurred, indicating a high probability that the recognition of the previous utterances was correct. Similarly, a low value indicates that some re-prompting did occur, indicating a lower probability that the recognition of the previous speech utterance was correct.

The confidence classifier module 304 uses the global features to adjust the current utterance confidence calculated from the local features. In some examples, values from the global feature vector are multiplied together and then multiplied by the values from the local feature vector. In other examples, a separate algorithm is used to combine local and global features in a different manner.

The example speech recognition system 104 is typically implemented on a computing device such as a client computer or a server computer. The example current utterance recognition module 402 and the example confidence classifier module 304 are typically software modules that are implemented on the computing device. The current utterance module 402 and confidence classifier module 304 are sometimes implemented as purchased software that is installed as a plug-in on the computing device. Alternately, the current utterance module 402 and the confidence classifier module 304 may be pre-loaded on the computing device.

Figure 5:
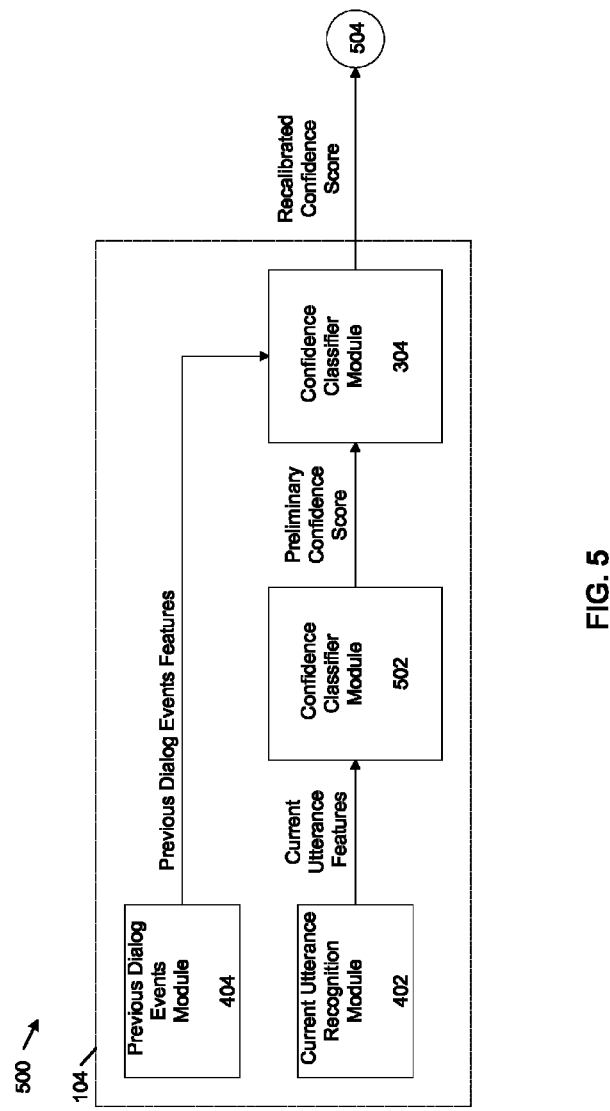
FIG. 5 shows an example speech recognition system that provides an alternate configuration for determining confidence for a current utterance using previous dialog events.

FIG. 5 shows an example system 500 that provides an alternate configuration for determining confidence for a current speech utterance using previous dialog events. In the example system 500, two levels of confidence classification are used. First, the local feature vector from the example current utterance recognition module 402 is input to the example confidence classifier module 502 and a preliminary confidence score is calculated based on the local feature vector alone. In examples, the example confidence classifier 502 is a purchased confidence classifier module that cannot be modified. In other examples, confidence classifier module 502 is the same module as the example confidence classifier module 304.

In some examples, the values of each feature from the current utterance recognition module 402 is multiplied together to determine the preliminary confidence score. In other examples, the values of each local feature may be weighted in the example confidence classifier module 502 or used in conjunction with one or more algorithms to determine the preliminary confidence score.

In the example system 500, after the preliminary confidence score is calculated, current speech utterance confidence is recalculated in a second confidence classifier module, for example, confidence classifier module 304, using the preliminary confidence score from confidence classifier module 502 as one input and using the global feature vector from the previous dialog events module 404 as another input. The global feature vector provides an interaction context for the overall speech dialog that is used to adjust the preliminary confidence score. As a result of leveraging the interaction context of the overall speech dialog, a recalibrated confidence score 505 is generated that represents an improvement over the preliminary confidence score.

In examples, a confidence score for one or more global features may be multiplied together and then multiplied by the preliminary confidence score. In other examples, the confidence score for one or more global features may be weighted before multiplying with the preliminary confidence score. In other examples, the confidence classifier module 304 may recalibrate the preliminary confidence score by using one or more algorithms in conjunction with the global feature vector to modify the preliminary confidence score. The result of the recalibration the recalibrated confidence score 504.

Prior to determining confidence scores during the actual use of a speech recognition system, confidence classifiers are also used offline to train the models used in the confidence classifiers. During offline training, a confidence classifier, for example confidence classifier 304, is presented with a number of examples of feature vectors for speech utterances. Each feature vector is associated with a binary label indicating whether a speech recognition corresponding to the feature vector was correct or not. As a result, during actual use when confidence classifier 304 receives a feature vector similar to the example, the confidence classifier attempts to predict the binary label by providing a score approximating the binary label. In the framework of this disclosure, this score represents a recognition confidence score.

Another form of confidence recalibration permits the use of global features extracted from all events of the dialog, including dialog events occurring prior to a speech utterance and dialog events occurring after the speech utterance. This recalibration is conducted offline after the entire dialog has been logged in a log file.

Figure 6:
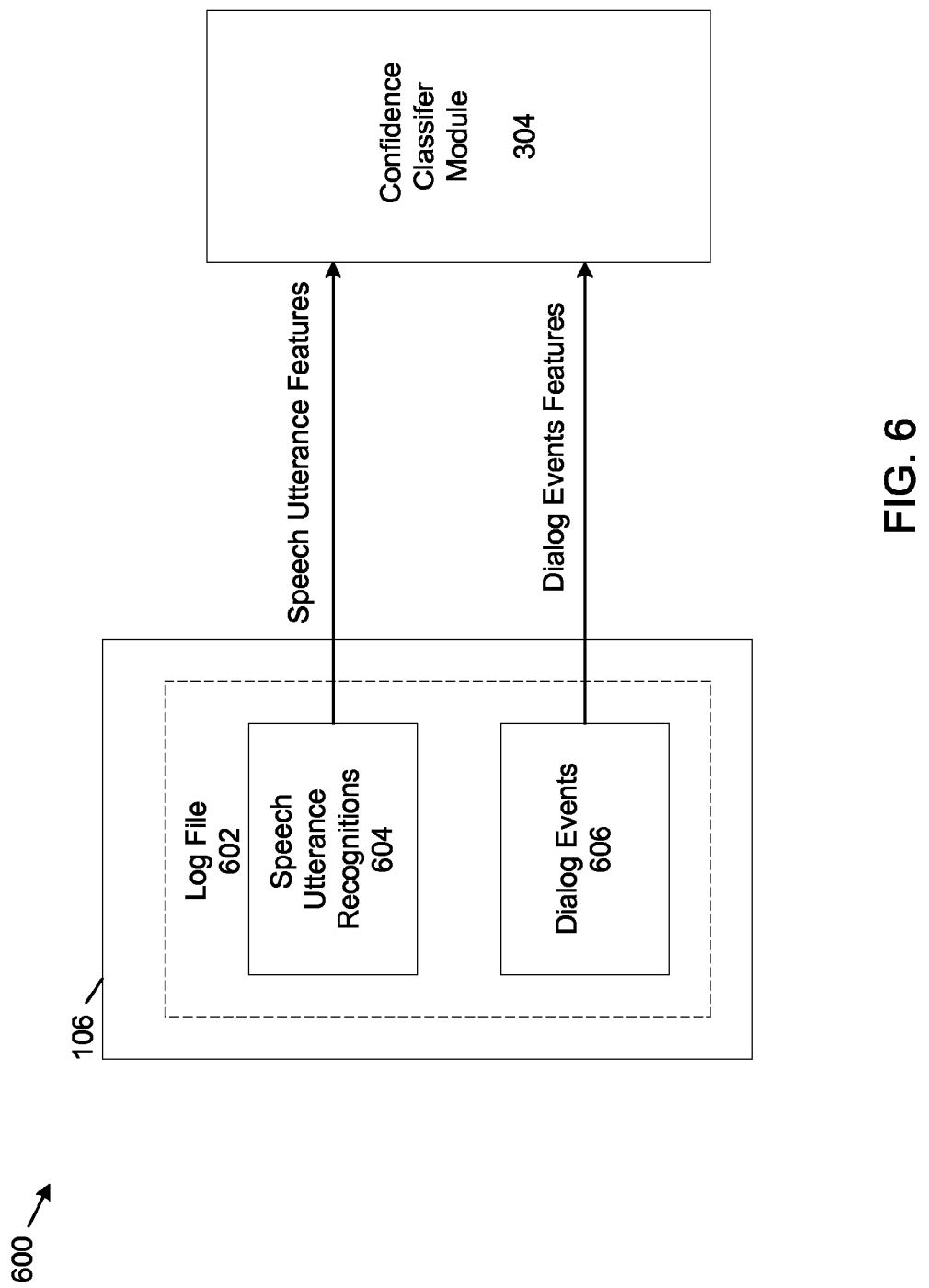
FIG. 6 shows an example speech recognition system that uses speech utterance and dialog event information from a log file to retrain one or more models for calculating speech utterance confidence.

FIG. 6 shows an example system 600 that uses speech utterance and dialog event information from a log file to retrain one or more models for calculating speech utterance confidence. The availability of features from both past and future dialog events in the log file improves confidence recalibration and thus permits the speech recognition system 104 to improve automatic selection of correctly recognized speech utterances among all recognized speech utterances in a speech dialog. Improved selection permits the one or more models to be retrained so that future recognition of speech utterances is improved.

In the example system 600, the model retraining is performed on an offline basis. The example system 600 includes an example log file 602 and an example confidence classifier module 304. The example log file 602 stores features from one or more dialog events 606. The example log file 602 is typically stored in a database, for example in database 106. However, in examples, the log file 602 may be stored elsewhere in speech recognition system 104.

The example log file 602 includes example speech utterance recognitions 604 and example speech dialog events 606. In the example system 600, dialog events 606 for an utterance can come from all surrounding dialog events. Because all of dialog events are stored in the log file 602, all speech utterances in the dialog, except the first and the last each have dialog events that are previous to it and follow it in the speech dialog. Therefore, context information regarding each speech utterance can be obtained from the example log file 602 that may not be available from current speech utterances.

For example, information from future dialog events is not available when calculating a confidence score for a current speech utterance, but information from future dialog events is available from the example log file 602. The speech dialog events 606 includes features automatically extracted from the log file 602 that reflect the context of previous and future speech utterances in a speech dialog.

When retraining, each speech utterance is evaluated in sequence, one speech utterance at a time. For each speech utterance, the log file 602 provides scores calculated in the current utterance recognition module 402 for the current utterance. In addition, global features are automatically derived from the log file for dialog events previous to the current utterance and for dialog events occurring after the current speech utterance. The position of the current speech utterance in the dialog is one global feature that is derived from the log file 602. Other global features include the degree of re-prompting that occurred previous to and after each current utterance.

Figure 7:
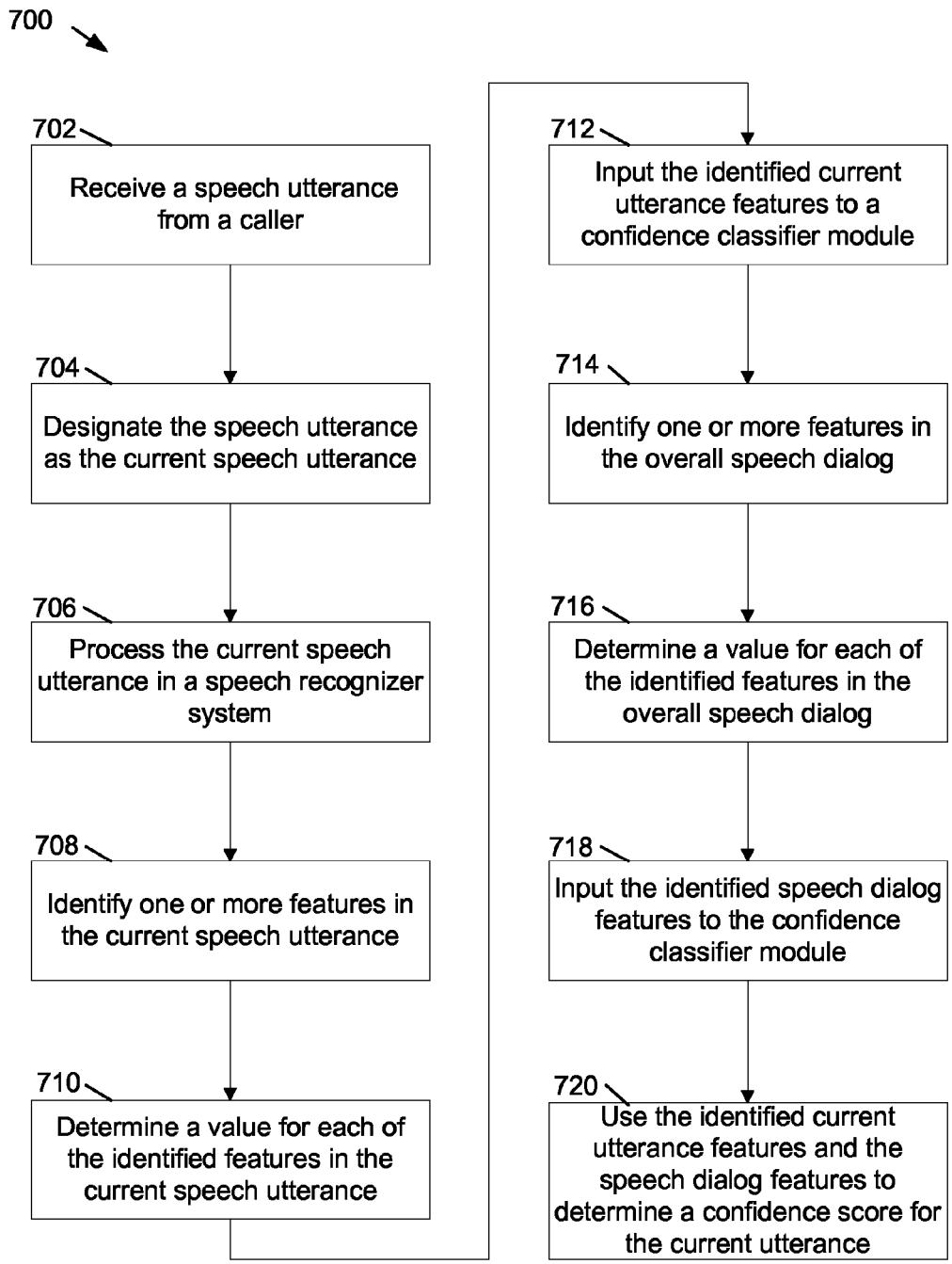
FIG. 7 shows an example flowchart of a method for determining a confidence score of a current speech utterance.

As an example, a caller is prompted for a city name, the user responded with "Redmond, Washington," and during the speech utterance there was a prompt for a confirmation, for example "Did you say Redmond, Washington"? If during the confirmation, the caller responds with "no", the negative confirmation reduces the recognition confidence of the first recognition of Redmond, Washington. In this way, the recognition models are retrained to improve recognition confidence FIG. 7 shows an example flowchart of a method 700 for determining a confidence score of a current speech utterance using local features from the current speech utterance and global dialog-level features from the overall speech dialog. At operation 702 a speech recognition system receives a speech utterance from a caller. The speech utterance is part of an overall speech dialog that includes a plurality of speech utterances. At operation 704, the speech utterance is designated as the current speech utterance.

At operation 706, the current utterance is processed in the speech recognition system. Processing the current utterance in the speech recognition system includes such actions as transcribing the audio signal for the speech utterance into a textual format by attempting to match the words and or phrases of the speech utterance with words and phrases in one or more speech models stored in the speech recognition system.

At operation 708, one or more local features are identified in the current speech utterance. Some example local features include the length of the current speech utterance, the degree to which the current speech utterance matches recognized patterns in one or more speech models and the noise level of the acoustic signal corresponding to the current speech utterance. Other local features are possible.

At operation 710, a value is determined for each of the identified local features in the current speech utterance. For example, one value represents the degree to which there is confidence that a correct recognition is made for the current speech utterance based on the comparison of the current speech utterance with the one or more speech models. As another example, another value is generated for the noise level of the acoustic signal corresponding to the current speech utterance. The higher the value (typically having a range from zero to one), the higher the noise level.

At operation 712, a feature vector corresponding to the identified local features for the current speech utterance is input to a confidence classifier module, for example confidence classifier module 304. The feature vector includes all the identified local features along with their values.

At operation 714, one or more global features are identified from the overall speech dialog. The overall speech dialog comprises all of the speech utterances that have occurred in the speech dialog up to the current speech utterance. One example global feature from the overall speech dialog is the level of reprompting that occurred for one or more previous speech utterances in the dialog. Another example global feature is the position of each speech utterance in the overall speech dialog. Other global features may include a number of words in a previous speech utterance and the length of a speech dialog in seconds. Other global features are possible.

At operation 716, a value is determined for each of the identified global features in the overall speech dialog. At operation 718, the identified global features from the overall speech dialog are input to the confidence classifier module 304.

At operation 720, the confidence classifier module 304 determines an overall confidence score for the current speech utterance using both the values from the local feature vector and from the identified global features from the overall speech dialog. Values for the identified global features typically adjust a preliminary confidence score calculated from the local features. For example, a high level of reprompting in the overall speech dialog typically results in a lower overall confidence score for the current speech utterance than if a low level or reprompting in the overall speech dialog or if no reprompting occurred.

Figure 8:
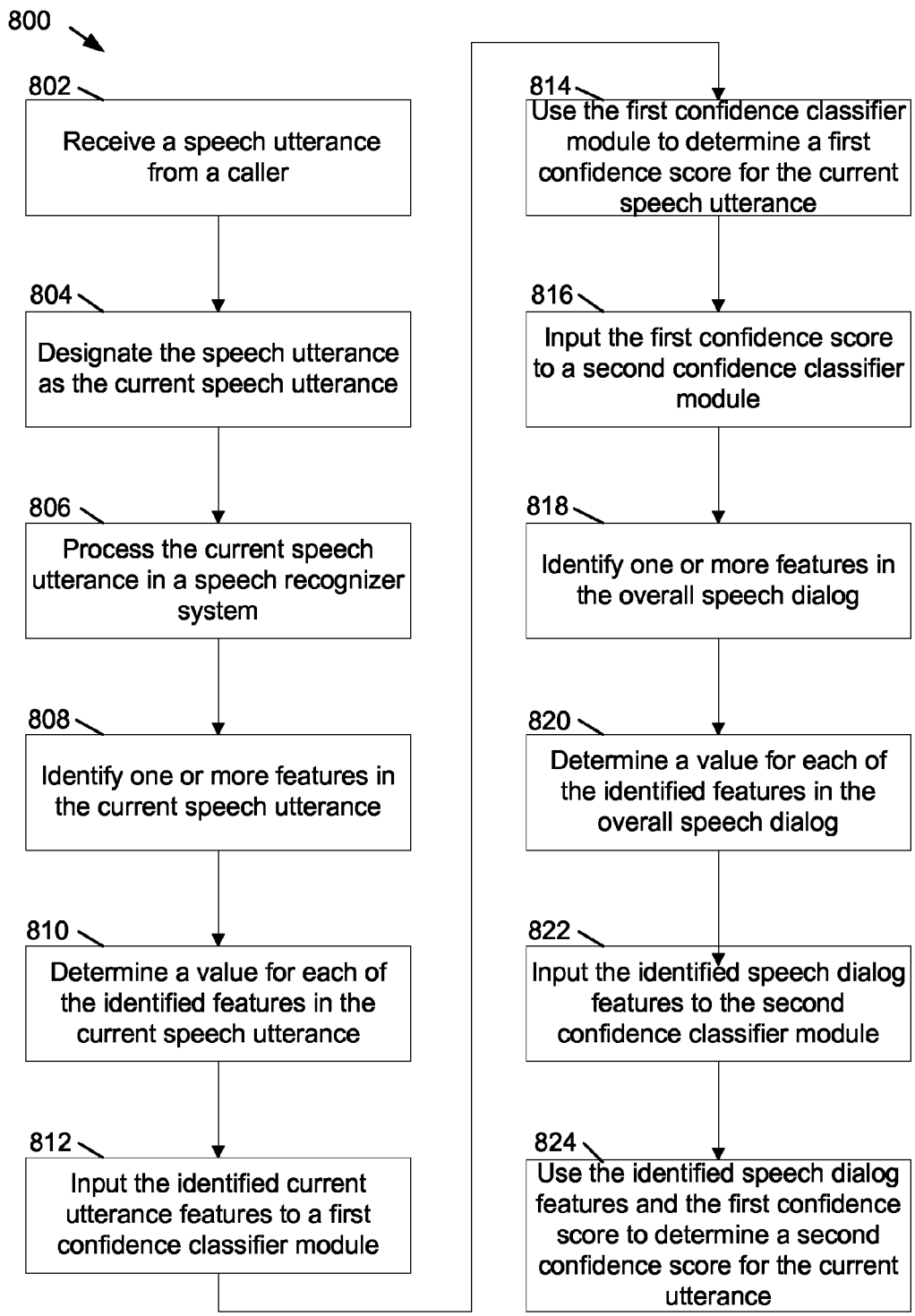
FIG. 8 shows an example flowchart of an alternate method for determining a confidence score of a current speech utterance.

FIG. 8 shows an example flowchart of a method 800 for determining a confidence score of a current speech utterance using two confidence classifiers. At operation 802 a speech recognition system receives a speech utterance from a caller. The speech utterance is part of an overall speech dialog that includes a plurality of speech utterances. At operation 804, the speech utterance is designated as the current speech utterance.

At operation 806, the current utterance is processed in the speech recognition system. Processing the current utterance in the speech recognition system includes such actions as transcribing the audio signal for the speech utterance into a textual format by attempting to match the words and or phrases of the speech utterance with words and phrases in one or more speech models stored in the speech recognition system.

At operation 808, one or more local features are identified in the current speech utterance. Some example local features include the length of the current speech utterance, the degree to which the current speech utterance matches recognized patterns in one or more speech models and the noise level of the acoustic signal corresponding to the current speech utterance. Other local features are possible.

At operation 810, a value is determined for each of the identified local features in the current speech utterance. For example, one value represents the degree to which there is confidence that a correct recognition is made for the current speech utterance based on the comparison of the current speech utterance with the one or more speech models. As another example, a value is generated for the noise level of the acoustic signal corresponding to the current speech utterance. The higher the noise level value (typically having a range from zero to one), the higher the noise level.

At operation 812, the identified current utterance features are applied to a first confidence classifier module. At operation 814, the first confidence classifier module determines a first confidence score for the current speech utterance. At operation 816, the first confidence score is input to a second confidence classifier module.

At operation 818, one or more global features are identified from the overall speech dialog. The overall speech dialog comprises all of the speech utterances that have occurred in the speech dialog up to the current speech utterance. One example global feature from the overall speech dialog is the level of reprompting that occurred for one or more previous speech utterances in the dialog. Another example global feature is the position of each speech utterance in the overall speech dialog.

At operation 820, a value is determined for each of the identified features in the overall speech dialog. At operation 822, the identified global features from the overall speech dialog are applied to the second confidence classifier module 304.

At operation 824, the confidence classifier module 304 determines an overall confidence score for the current speech utterance using both the values from the local feature vector and the identified global features from the overall speech dialog. Values for the identified global features typically adjust a preliminary confidence score calculated from the local features. For example, a high level of reprompting in the overall speech dialog typically results in a lower overall confidence score for the current speech utterance than if a low level or reprompting in the overall speech dialog or if no reprompting occurred.

Figure 9:
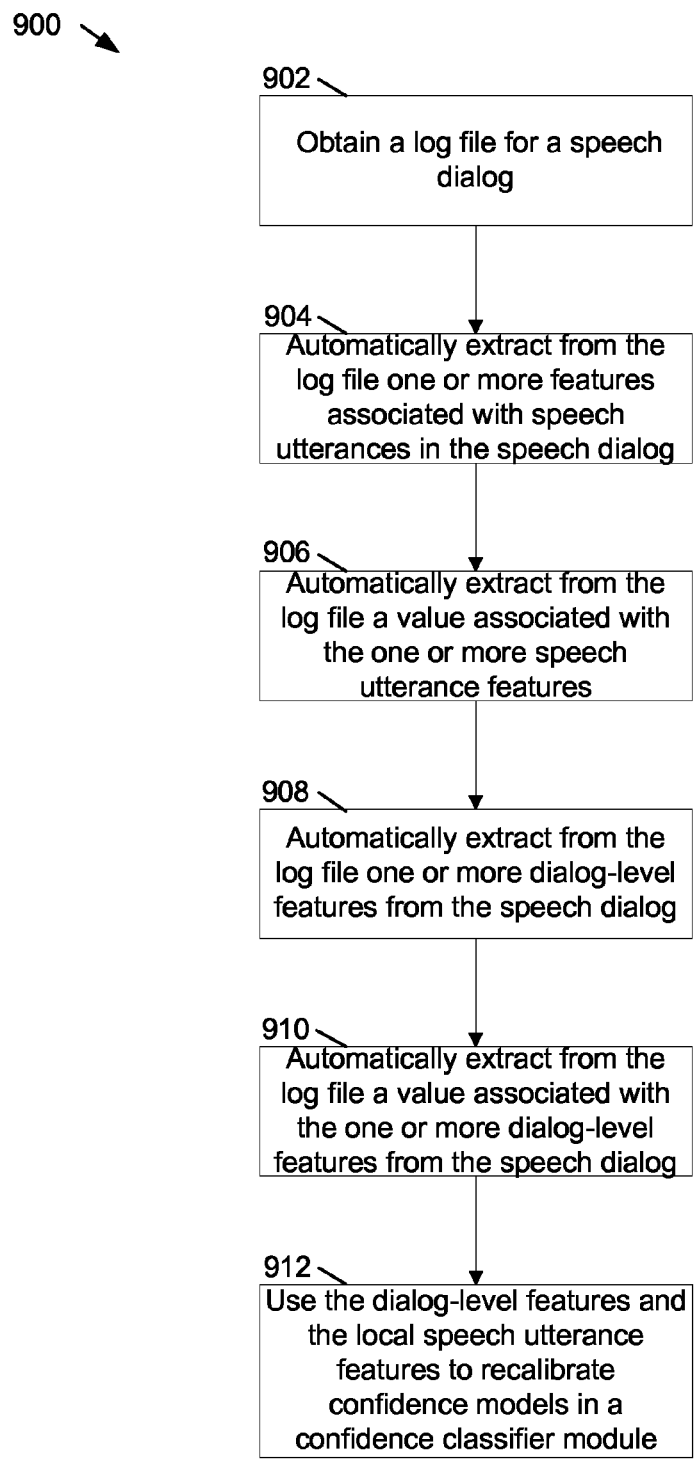
FIG. 9 shows an example flowchart of a method for using speech utterance data from a log file to recalibrate one or more confidence generation models in a confidence classifier module.

FIG. 9 shows an example flowchart of a method 900 for using speech utterance data from a log file to recalibrate one or more confidence generation models in a confidence classifier module, for example the confidence classifier module 304 shown in FIG. 4. At operation 802, a log file, for example log file 602 is obtained for a speech dialog. The example log file 602 is included on database 106 and includes speech utterances from one for more speech dialogs.

At operation 904, one or more local features associated with one or more speech utterances in the speech dialog are extracted from the example log file 602. The example local features, for example the noise level of the acoustic signal associated with a speech utterance are stored in the log file 602 when the current utterance is processed.

At operation 906, a value associated with each of the one or more of the local features of operation 904 are extracted from the log file 602. The values reflect a characteristic about the local feature. For example, the degree of confidence in the correct recognition of a particular speech utterance may be given a value between zero and one, where a one represents a 100% probability that the recognition is correct.

At operation 908, one or more global dialog-level features for a speech dialog are automatically extracted from the example log file 602. In addition, values for the one or more global dialog-level features are also automatically extracted from the log file 602. The global dialog-level features and values are automatically extracted from the log file 602 when the log file 602 is read. Some example global features are the position of each speech utterance in the speech dialog and the degree to which reprompting occurs in the speech dialog.

At operation 910, a value associated with each of the one or more of the global dialog-level features of operation 908 are extracted from the log file 602. The values reflect a characteristic about the global feature.

At operation 912, the dialog level features and the local speech utterance features are used to recalibrate confidence models in the example confidence classifier module 304. The recalibration of the confidence models comprises adjusting confidence levels for the recognition of speech utterance patterns included in the speech recognition system 104.

With reference to FIG. 10, example components of speech recognition system 104 are shown. In example embodiments, the speech recognition system 104 is a computing device. The speech recognition system 104 can include input/output devices, a central processing unit ("CPU"), a data storage device, and a network device.

In a basic configuration, the speech recognition system 104 typically includes at least one processing unit 1002 and system memory 1004. Depending on the exact configuration and type of computing device, the system memory 1004 may be volatile (such as RAM), non-volatile (such as ROM, flash memory, etc.) or some combination of the two. System memory 1004 typically includes an operating system 1006 suitable for controlling the operation of a networked personal computer, such as the Windows® operating systems from Microsoft Corporation of Redmond, Washington or a server, such as Microsoft Exchange Server 2007, also from Microsoft Corporation of Redmond, Wash. The system memory 1004 may also include one or more software applications 1008 and may include program data.

The speech recognition system 104 may have additional features or functionality. For example, the speech recognition system 104 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 10 by removable storage 1010 and non-removable storage 1012. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the speech recognition system 104. Any such computer readable storage media may be part of the speech recognition system 104. The speech recognition system 104 may also have input device(s) 1014 such as keyboard, mouse, pen, voice input device, touch input device, etc. Output device(s) 1016 such as a display, speakers, printer, etc. may also be included.

The speech recognition system 104 may also contain communication connections 1018 that allow the device to communicate with other computing devices 1020, such as over a network in a distributed computing environment, for example, an intranet or the Internet. Communication connection 1018 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The various embodiments described above are provided by way of illustration only and should not be construed to limiting. Various modifications and changes that may be made to the embodiments described above without departing from the true spirit and scope of the disclosure.

What is claimed is:

1. A computer-implemented method for improving speech recognition on a computing device, the method comprising:
   accessing, on the computing device, a log file comprising a plurality of speech dialogues, wherein each of the plurality of speech dialogues is associated with an interaction context and comprises one or more speech utterances;
   automatically extracting from the log file:
   one or more features associated with the one or more speech utterances;
   a first confidence score associated with the one or more features associated with the one or more speech utterances;
   one or more dialog-level features from the speech dialog, each dialog-level feature corresponding to a specific characteristic of the speech dialog; and
   a value associated with each of the one or more dialog-level features from the speech dialog; and
   using the values associated with the one or more dialog-level features to adjust the first confidence score associated with one or more of the speech utterances.

2. The method of claim 1, wherein the dialog-level features include a position of each utterance in the speech dialog.

3. The method of claim 1, wherein the dialog-level features include a degree in which re-prompting occurred for one or more utterances in the speech dialog.

4. The method of claim 1, wherein the adjusting of the first confidence score is associated with recalibrating one or more speech recognition models on the computing device.

5. The method of claim 1, wherein the adjusting of the first confidence score is associated with recalibrating a confidence classifier module.

6. The method of claim 1, wherein the one more features associated with the one or more speech utterances includes a degree to which an acoustic match is determined for each speech utterance.

7. The method of claim 1, wherein the one or more features associated with the one or more speech utterances includes a noise of an acoustic signal associated with each speech utterance.

8. The method of claim 1, wherein the one or more features associated with the one or more speech utterances includes a degree to which a first recognition for a speech utterance is similar to a second recognition for the speech utterance.

9. A system comprising:
   one or more processors; and
   a memory coupled to the one or more processors, the memory for storing instructions which, when executed by the one or more processors, performs a method for improving speech recognition on a computing device, the method comprising:
   accessing, on the computing device, a log file comprising a plurality of speech dialogues, wherein each of the plurality of speech dialogues is associated with an interaction context and comprises one or more speech utterances;
   automatically extracting from the log file:
   one or more features associated with the one or more speech utterances;
   a first confidence score associated with the one or more features associated with the one or more speech utterances;
   one or more dialog-level features from the speech dialog, each dialog-level feature corresponding to a specific characteristic of the speech dialog; and
   a value associated with each of the one or more dialog-level features from the speech dialog; and
   using the values associated with the one or more dialog-level features to adjust the first confidence score associated with one or more of the speech utterances.

10. The system of claim 9, wherein the dialog-level features further include at least a degree in which re-prompting occurred for one or more utterances in the speech dialog.

11. The system of claim 9, wherein the adjusting of the first confidence score is associated with recalibrating one or more speech recognition models on the computing device.

12. The system of claim 9, wherein the adjusting of the first confidence score is associated with recalibrating a confidence classifier module.

13. The system of claim 9, wherein the one more features associated with the one or more speech utterances includes a degree to which an acoustic match is determined for each speech utterance.

14. The system of claim 9, wherein the one or more features associated with the one or more speech utterances includes a noise of an acoustic signal associated with each speech utterance.

15. The system of claim 9, wherein the one or more features associated with the one or more speech utterances includes a degree to which a first recognition for a speech utterance is similar to a second recognition for the speech utterance.

16. The system of claim 9, wherein the log file includes contextual information for the one or more speech utterances.

17. The system of claim 16, wherein the contextual information includes information from previous and future speech utterances in the speech dialog.

18. The system of claim 9, wherein the speech dialog includes a plurality of dialog events, and wherein the one or more dialog-level features are derived from the log file for a first dialog event of the plurality of dialog events occurring previous to a current speech utterance and for a second dialog event of the plurality of dialog events occurring after the current speech utterance.

19. A hardware device comprising instructions that, when executed by a computing device, cause the computing device to:
   access, on the computing device, a log file comprising a plurality of speech dialogues, wherein each of the plurality of speech dialogues is associated with an interaction context and comprises one or more speech utterances;
   automatically extract from the log file:
      one or more features associated with the one or more speech utterances;
      a first confidence score associated with the one or more features associated with the one or more speech utterances;
      one or more dialog-level features from the speech dialog, each dialog-level feature corresponding to a specific characteristic of the speech dialog; and
      a value associated with each of the one or more dialog-level features from the speech dialog; and
   use the values associated with the one or more dialog-level features to adjust the first confidence score associated with one or more of the speech utterances.

20. The hardware device of claim 19, wherein the dialog-level features further include a value associated with re-prompting for the one or more utterances in the speech dialog.

* * * * *